(12) United States Patent
Gupta

(10) Patent No.: US 7,284,194 B2
(45) Date of Patent: Oct. 16, 2007

(54) XML BASED REPORT GENERATOR

(75) Inventor: Arun P. Gupta, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 459 days.

(21) Appl. No.: 10/038,338

(22) Filed: Oct. 23, 2001

(65) Prior Publication Data

US 2004/0205565 A1    Oct. 14, 2004

(51) Int. Cl.
*G06F 15/00* (2006.01)
*G06F 17/00* (2006.01)

(52) U.S. Cl. .................. 715/513; 707/10; 707/101; 717/124

(58) Field of Classification Search ............. 715/513; 434/350, 322, 335; 707/10, 101; 714/38; 717/124
See application file for complete search history.

(56) References Cited

U.S. PATENT DOCUMENTS

| | | | |
|---|---|---|---|
| 5,157,779 A * | 10/1992 | Washburn et al. | 714/37 |
| 6,112,049 A * | 8/2000 | Sonnenfeld | 434/350 |
| 6,519,617 B1 * | 2/2003 | Wanderski et al. | 715/513 |
| 6,768,994 B1 * | 7/2004 | Howard et al. | 707/10 |
| 6,826,716 B2 * | 11/2004 | Mason | 714/38 |
| 2001/0056429 A1 * | 12/2001 | Moore et al. | 707/101 |
| 2002/0107889 A1 * | 8/2002 | Stone et al. | 707/513 |
| 2005/0198042 A1 * | 9/2005 | Davis | 707/10 |

FOREIGN PATENT DOCUMENTS

JP    2001101036    4/2001

OTHER PUBLICATIONS

Multidocument summarization via information extraction Michael White, Tanya Korelsky et al., Mar. 2001, ACM pp. 1-7.*
P. Lowry, "*XML Data Mediation and Collaboration: A Proposed Comprehensive Architecture and Query Requirements for Using to Mediate Heterogeneous Data Sources and Targets,*" Jan. 3-6, 2001, Proceedings of the 34th Annual Hawaii International Conference on System Sciences.

* cited by examiner

*Primary Examiner*—William Bashore
(74) *Attorney, Agent, or Firm*—Martine Penilla & Gencarella, LLP

(57) ABSTRACT

An invention is provided for creating a test summary report. A test application is executed on a platform, where the test application is executed using a status utility having functions that generates XML code. The test results are generated in a XML enabled format using the status utility, and are output to a test execution log file. The test execution log file is processed to generate a well-formed XML test reports file, which is then logically arranged to create a logically arranged XML test reports file. The logically arranged XML test reports file is converted into a HTML test summary report.

19 Claims, 8 Drawing Sheets

```
<!DOCTYPE LOGFILE [

<!ELEMENT LOGFILE (TEST)>

<!ELEMENT TEST (TEST-NAME, TEST-CASE, TEST-SUMMARY)>

<!ATTLIST TEST
        SUITE-NAME CDATA #REQUIRED>
        CATAGORY CDATA #REQUIRED>

<!ELEMENT TEST-NAME (#PCDATA)>

<!ELEMENT TEST-CASE (TEST-CASE-ID, TEST-CASE-DESC)>

<!ELEMENT TEST-SUMMARY (TEST-CASES-PASSED, TEST-CASES-FAILED)>

<!ATTLIST TEST-CASE-ID STATUS CDATA #REQUIRED>

<!ELEMENT TEST-CASE-DESC (#PCDATA)>

<!ELEMENT TEST-CASES-PASSED (#PCDATA)>

<!ELEMENT TEST-CASES-FAILED (#PCDATA)>

… # XML BASED REPORT GENERATOR

BACKGROUND OF THE INVENTION

1. Field of the Invention

This invention relates generally to computer testing, and more particularly to automated test summary report generation.

2. Description of the Related Art

Business and other application programs execute in a wide variety of operating environments. Before deploying an application program, it is often desirable to test the application program to determine its suitability for the operating environment and to discover any problems associated with the application program before any undesirable physical, economic, or other damage may occur.

As the number and complexity of application programs and operating environments continue to increase, along with the potential damage that defects and problems associated with application programs may cause in some circumstances, techniques for testing application programs have become increasingly important. In conventional application program testing, a simulation of the operating environment in which the application program is intended to execute is generated. The application program is then executed within the simulated operating environment and the test results obtained.

FIG. 1 is diagram showing a prior art testing cycle 100. During a conventional test cycle, a test application 102 is executed on a particular platform 104. Generally, the test application 102 includes a plurality of test suites, which are used to test various aspects of an environment. For example, the test application 102 can include a plurality of test suites to test a particular Java application program interface (API).

The results of the test execution are then captured in a test execution log file 106. The test execution log file 106 includes detailed descriptions of which tests were executed and the results of each test. Generally, the test execution log file 106 is a long document having very detailed information. As such, the test execution log file 106 can be difficult to interpret. Thus, the testing team running the tests often manually analyzes the test execution log file 106 to determine which tests pass and which tests fail. In the case of failures, the testing team uses the test execution log file to determine where the failures are occurring and why the failures are occurring. These results are then summarized in a test summary report 108.

As the name implies, the test summary report 108 provides a summary of the detailed testing information contained in the test execution log file 106. In addition, the test summary report 108 includes a summary of the analysis performed on the test execution log file 106. Often, the test summary file 108 lists the tests that were executed and whether the test passed or failed. For example, the test summary report of FIG. 1 illustrates two test suites, test suite X and test suite Y. Test suite X has thirty tests of which twenty-eight passed and two failed. Test suite Y has forty tests of which fourteen passed and twenty-six failed. Thus, to create the test summary 108 of FIG. 1, the testing team must manually analyze the test results in the test execution log file 106 for seventy tests.

The test summary report 108 is then distributed to the appropriate personal, such as the project manager or development team. Although the conventional testing cycle 100 described above can provide test summary reports 108, the conventional process of generating the test summary report 108 is very time intensive and subject to errors. For example, manual counting of the tests pass and fail results is subject to counting errors, in which case the entire test suite would need to be reexamined. Moreover, conventionally over twenty hours per platform 104 is often needed to produce the test summary report 108.

In view of the foregoing, there is a need for systems and method for test report generation. The methods should provide test summary reports in an automated manner to reduce total test cycle time requirements and human error.

SUMMARY OF THE INVENTION

The embodiments of the present invention fill these needs by providing an Extensible Markup Language (XML) based report generator. The XML based report generator of the embodiments of the present invention allows a test summary report to be generated from a test execution log file quickly, generally without manual intervention from a user, and consequently, reducing human induced errors. In one embodiment, a method for creating a test summary report is disclosed. Broadly speaking, a test is executed and the test results are generated in an XML enabled format. The XML enabled test results are processed to create a test summary report.

In another embodiment, an XML based report generator is disclosed. The XML based report generator includes a parser that processes a test execution log file to generate a well-formed XML test reports file. In addition, a logical parser is included that processes the well-formed XML test reports file to produce a logically arranged XML test reports file. The XML based report generator further includes a Hypertext Markup Language (HTML) converter parser that converts the logically arranged XML test reports file into an HTML test summary file.

Another method for creating a test summary report is disclosed in a further embodiment of the present invention. The method includes executing a test application on a platform, where the test application is executed using a status utility having functions that generates XML code. The test results are generated in an XML enabled format using the status utility, and are output to a test execution log file. The test execution log file is processed to generate a well-formed XML test reports file, which is then arranged to create a logically arranged XML test reports file. The logically arranged XML test reports file is then converted into an HTML test summary report. Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which:

FIG. 3 is a diagram showing an exemplary Test DTD, in accordance with an embodiment of the present invention;

DETAILED DESCRIPTION OF THE PREFERRED EMBODIMENTS

An invention is disclosed for an XML based report generator. The XML based report generator of the embodiments of the present invention allows a test summary report to be generated from a test execution log file quickly, generally without manual intervention from a user, and consequently, reducing human induced errors. In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

Figure 1:
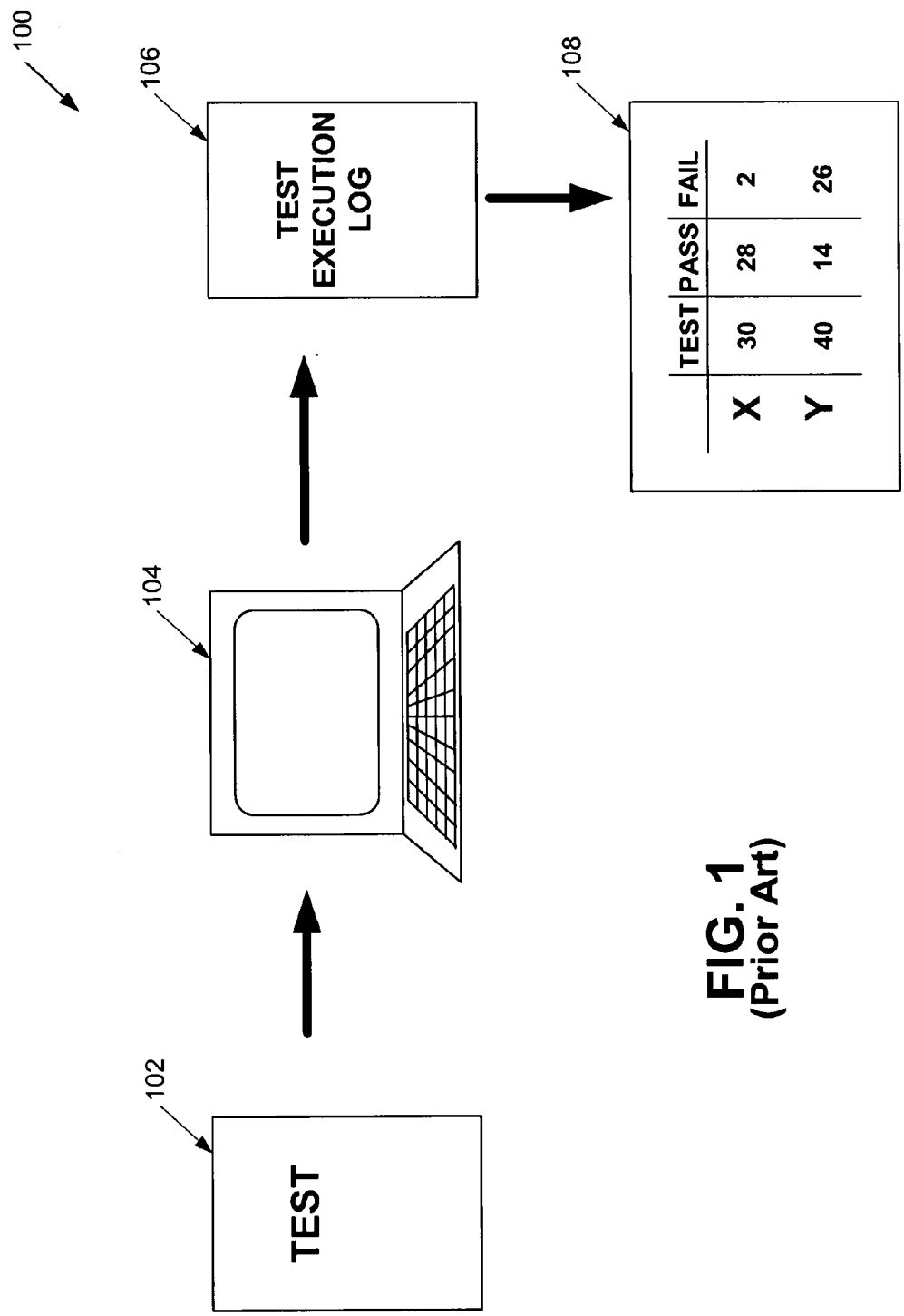
FIG. 1 is diagram showing a prior art testing cycle.
Figure 2A:
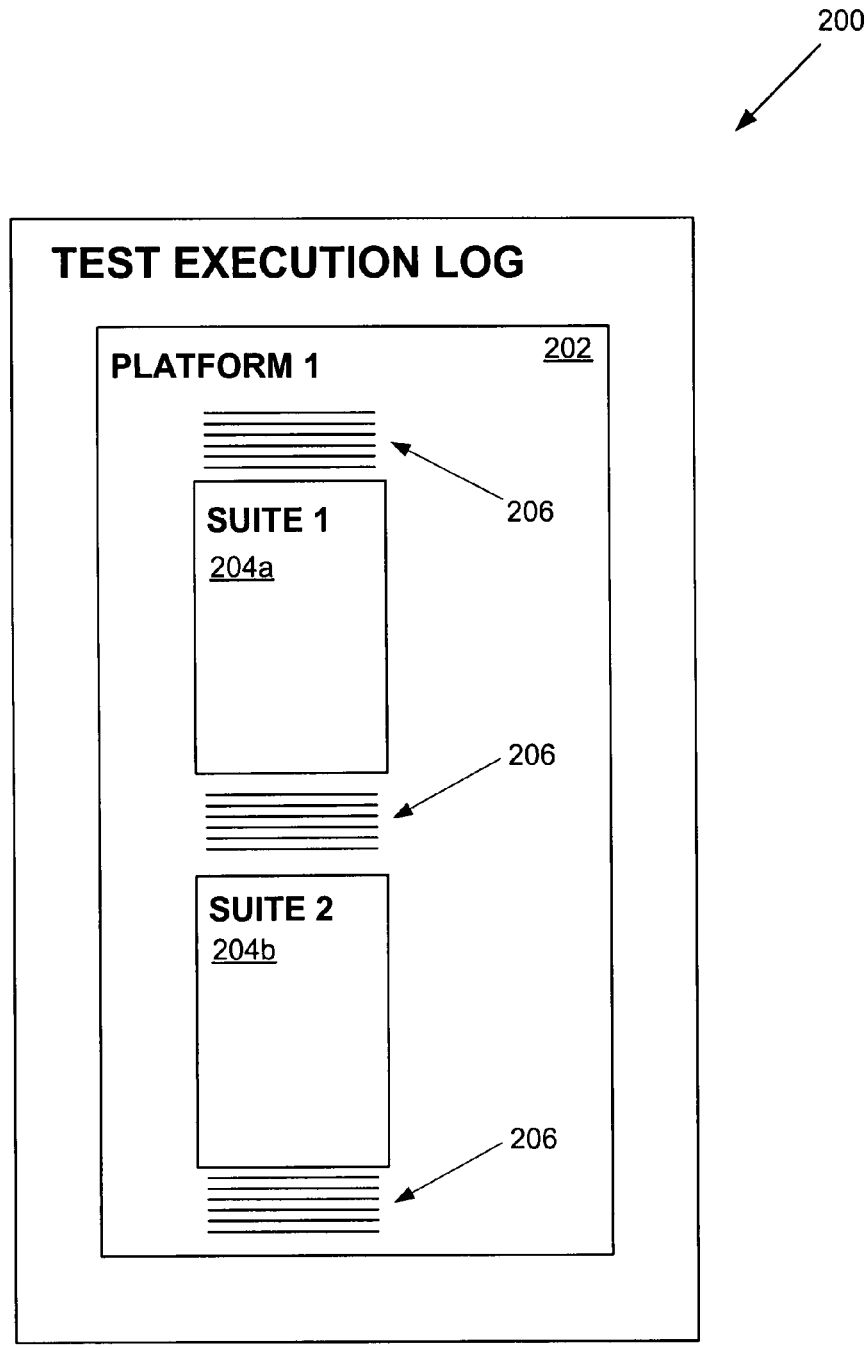
FIG. 2A is a block diagram showing a test execution log file, in accordance with an embodiment of the present invention.
Figure 2B:
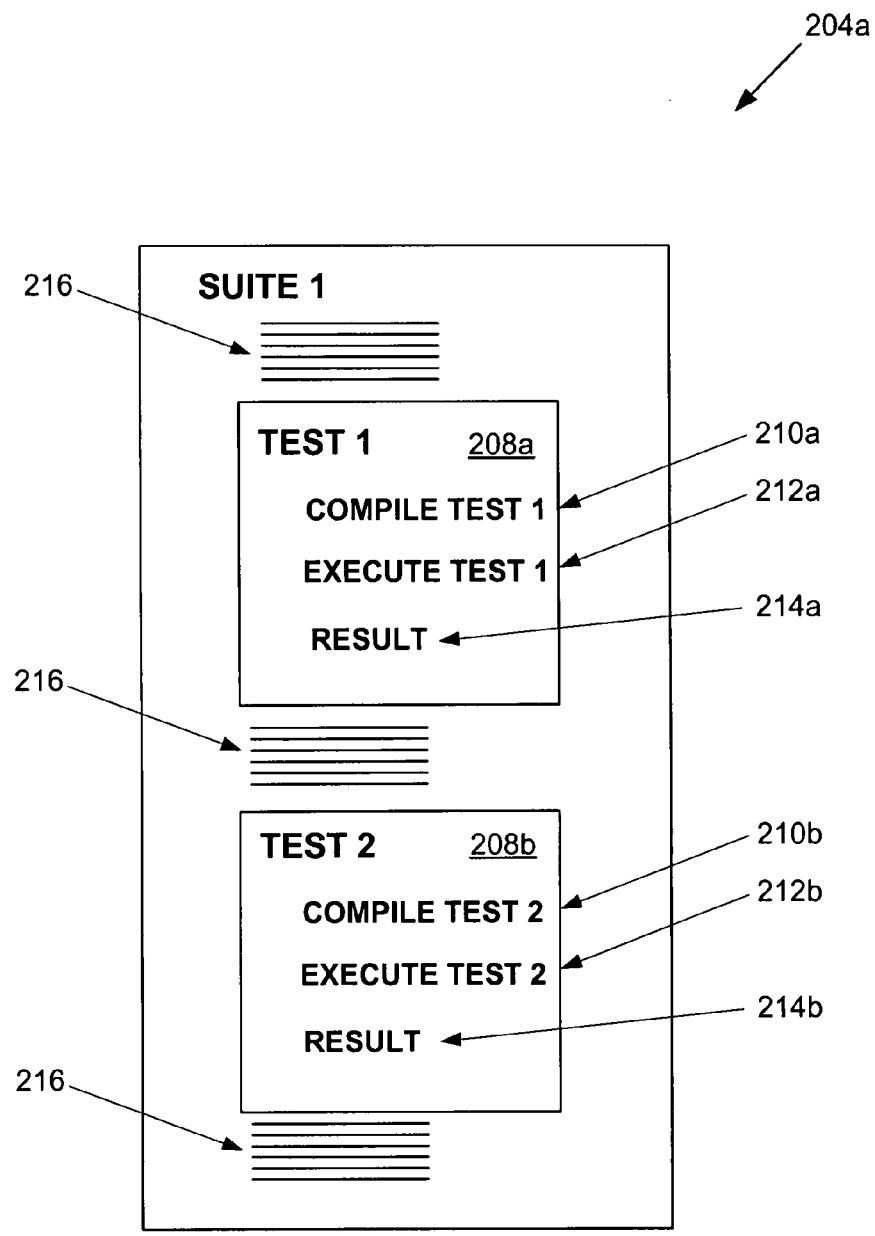
FIG. 2B is a block diagram showing a test suite listing, in accordance with an embodiment of the present invention.

FIG. 1 was described in terms of the prior art. FIGS. 2A and 2B illustrate components of a test execution log file. In particular, FIG. 2A is a block diagram showing a test execution log file 200, in accordance with an embodiment of the present invention. As mentioned above, the test execution log file 200 is created during execution of the test application, which includes a plurality of test suites. For example, a test application can include a plurality of test suites to test a particular Java application program interface (API).

The results of the test execution are captured in the test execution log file 200, which includes detailed descriptions of which tests were executed and the results of each test. In particular, the test execution log file 200 includes a platform listing 202 for each platform tested. Each platform listing 202 includes a plurality of test suite listings 204a-204b, each testing various aspects of the test environment. Additional test suite data 206 can be listed after each test suite listing 204a-204b indicating various test information, such as debugging and logging data. The test suite data 206 can also be listed before the first test suite listing 204a. Although the test execution log file 200 is shown in FIG. 2A with one platform listing 202 having two test suite listings 204a and 204b, it should be noted that a test execution log file 200 of the embodiments of the present invention can include any number of platform listings 202, each having any number of test suite listings 204.

FIG. 2B is a block diagram showing a test suite listing 204a, in accordance with an embodiment of the present invention. The test suite listing 204a includes a plurality of test listings 208a-208b, each listing the results of a particular test of the test suite 204a. Similar to test suite listings 204a, additional test data 216 can be listed before the first test listing 208a and after each test listing 208a-208b indicating various test information, such as debugging and logging data. As above, although the test suite listing 204a is shown in FIG. 2B having two test listings 208a and 208b, it should be noted that a test suite listing 204a of the embodiments of the present invention can include any number of test listings 208.

Each test listing 208a-208b lists compile test results 210a-210b, execute test results 212a-212b, and a test result 214a-214b. The compile test results 210a-210b list information on the test compilation for the particular test 208a. For example, the compile test results 210a can list whether or not the test 208a compiled correctly, and if not, source code errors. The execute test results 212a-212b list information on the test execution of the particular test 208a. For example, the execute test results 212a can list whether or not the test 208a executed correctly, and if not, the reason for the execution failure. The test results 214a-214b list the actual test output for the particular test. For example, test result 214a can list the actual test output for test 208a, including whether the test passed or failed, and in the case of failure, why the failure occurred and where the failure occurred. To automate the test cycle, embodiments of the present invention define an XML document type definition (DTD) for the test result phase 214.

XML is an open standard for describing data and is often used for defining data elements on a Web page and business-to-business documents. XML uses a similar tag structure as HTML. However, whereas HTML defines how elements are displayed, XML defines what those elements contain. Further, HTML uses predefined tags, while XML allows tags to be defined by the developer of the page. Thus, virtually any data items, such as test suites and individual tests, can be identified, allowing XML documents to function like database records.

The human-readable XML tags provide a simple data format, which is defined in a DTD format that defines content type as well as name. Thus, unlike HTML, which uses a rather loose coding style and which is tolerant of coding errors, XML pages are "well formed," which means they comply with rigid rules.

An XML document primarily comprises a strictly nested hierarchy of elements with a single root. Elements can contain character data, child elements, or a mixture of both. In addition, they can have attributes. Child character data and child elements are strictly ordered, while attributes are not. The names of the elements and attributes and their order in the hierarchy (among other things) form the XML markup language used by the document, also known as the "validity" of the document. As mentioned above, this language can be defined by the document author or it can be inferred from the document's structure. In particular, the embodiments of the present invention define four elements: test, test name, test case, and test summary, as discussed in greater detail subsequently with reference to FIG. 3.

FIG. 3 is a diagram showing an exemplary Test DTD 300, in accordance with an embodiment of the present invention. The exemplary test DTD 300 defines the elements Test 302, Test-Name 304, Test-Case 306, and Test-Summary 308. The element Test 302 includes zero or one Test-Name element 304, zero or more Test-Case elements 306, and a Test-Summary element 308. Test 302 has attributes Suite-Name 310 and Category 312. Suite-Name 310 identifies the test suite containing the test 302, and Category 312 can identify and API, product, or other classification the user desires. Test-Case-ID provides an ID for each test case, and includes a status attribute 314 that can have a value of passed or failed. Test-Case-Desc 316 provides a description or reason for a failure. In addition, Test-Case-Desc 316 can provide a message for a passed test. Test-Cases-Passed 318 and Test-Cases-Failed 320 indicate the number of tests passing or failing respectively.

The Test DTD 300 sets forth a format for use when reporting test results during application tests. In particular, defining the Test language as above allows an extensible stylesheet language transformation (XSLT) stylesheet parser to be used to process test results formatted according to the Test DTD 300. Based on the Test DTD 300, embodiments of the present invention generate test results that conform the Test DTD 300 via a status utility as described in greater detail next with reference to FIG. 4.

Figure 4:
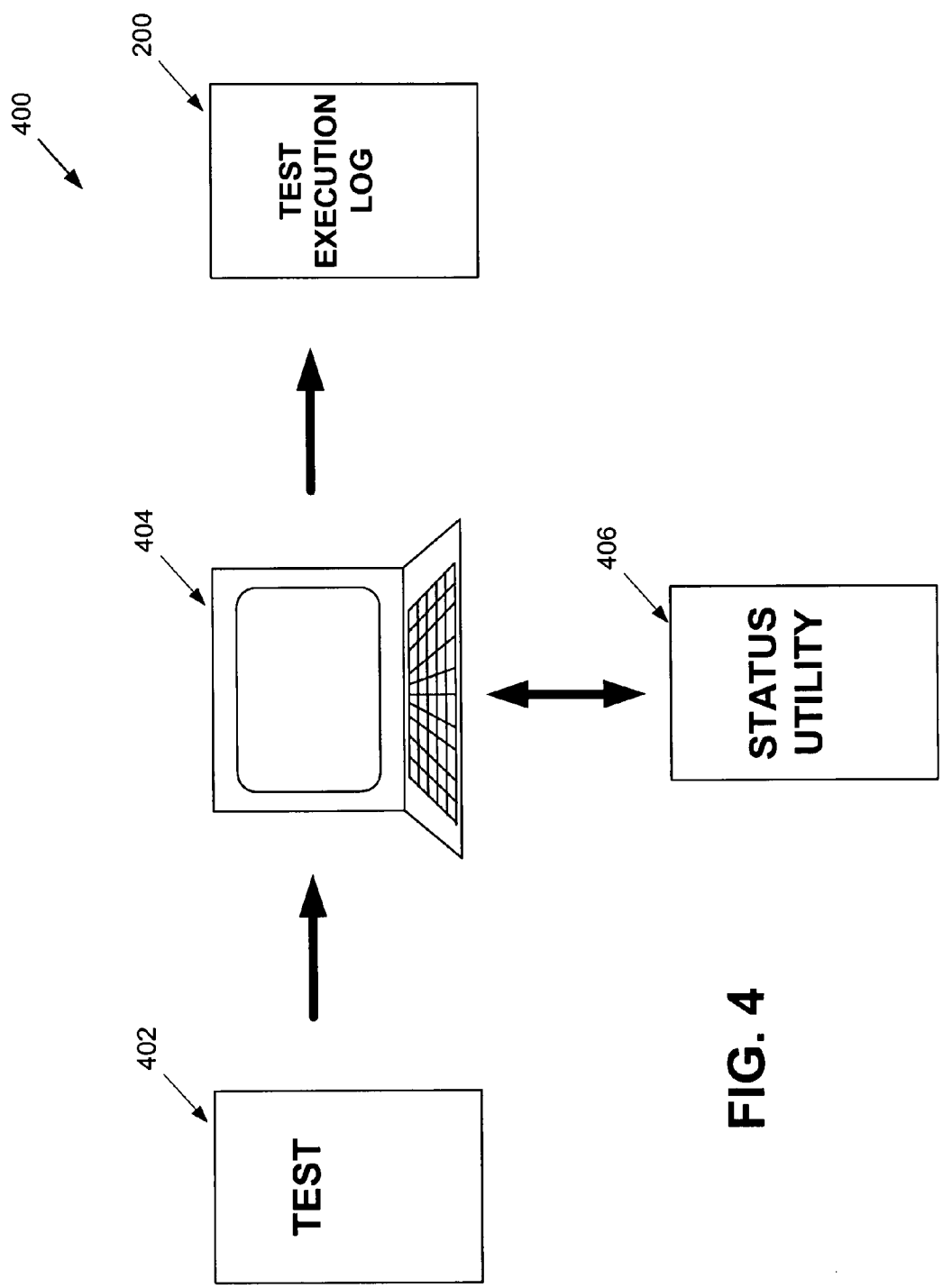
FIG. 4 is a logical diagram showing a testing system, in accordance with an embodiment of the present invention.

FIG. 4 is a logical diagram showing a testing system 400, in accordance with an embodiment of the present invention. In operation, a test application 402 is executed on a platform 404. The test application 404 includes a plurality of test suites, which are used to test various aspects of an environment, as mentioned above with respect to FIG. 2A. For example, the test application 404 can include a plurality of test suites to test a particular Java application program interface (API).

The results of the test execution are then captured in a test execution log file 200 which includes detailed descriptions of the tests that were executed and the results of each test, as described above with respect to FIGS. 2A and 2B. To generate the test results included in the test execution log file 200, embodiments of the present invention make function calls to a status utility 406. The status utility 406 includes functions that generate XML statements in accordance with the test DTD 300, discussed above with respect to FIG. 3. In particular, the test application 402 includes function calls to the functions provided in the status utility 406. These functions return XML statements in accordance with the test DTD 300, which are then written to the test execution log file 200. As a result, the test execution log file 200 includes test results that are XML enabled, in addition to non-XML enabled compiler and execution information as described above with reference to FIG. 2B.

Generally, the resulting test execution log file 200 is a long document having very detailed information. As such, the test execution log file 200 can be difficult to interpret. Thus, embodiments of the present invention process the test execution log file 200 into a test summary report using an automated process. Although the test execution log file 200 is process to create a test summary report, it will be noted that the test execution log file 200 can be saved and referred to when needed at a later date. For example, since the test execution log file 200 often includes compiling and execution information, this information can be later examined to determine the precise environment used for the test.

Embodiments of the present invention can also include the functions of the status utility 406 within the test application 402 document itself, or as part of a language library. In such embodiments, a separate status utility 406 may not be needed, since the functions will be present in other code elements, for example, within the test application 402 itself. In further embodiments, print statements or character output statements can be used to generate the XML enabled test results. In such embodiments, the print statements should create statements that are XML enabled according to a particular Test DTD, such as the exemplary Test DTD 300 of FIG. 3, as defined by the test developer. Regardless of the embodiment used to create the test execution log file 200, the test execution log file 200 is subsequently processed to create a well-formed XML document, which is used to create a test summary report.

Figure 5:
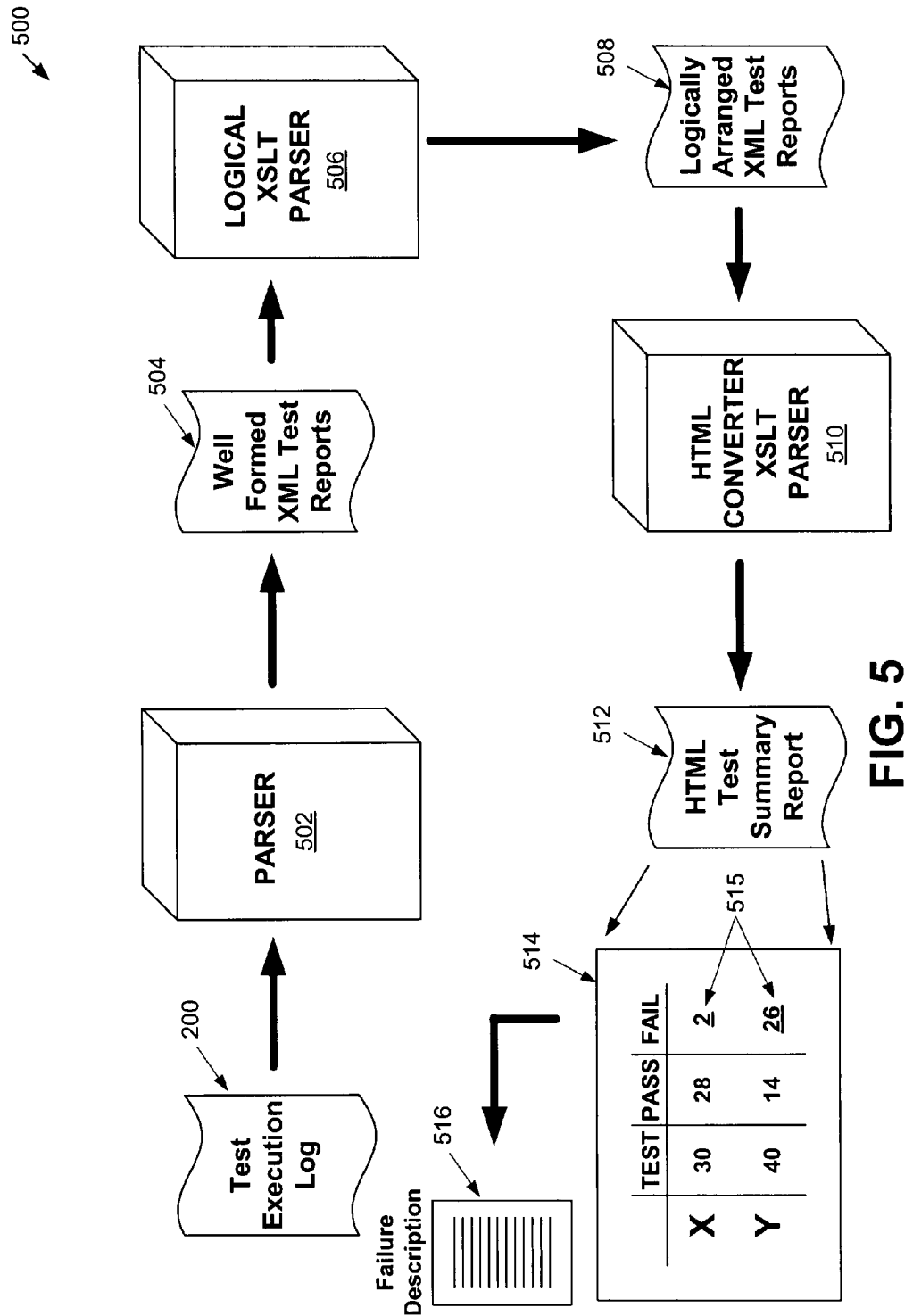
FIG. 5 is a logical diagram showing a process cycle for generating a test summary report, in accordance with an embodiment of the present invention.

FIG. 5 is a logical diagram showing a process cycle 500 for generating a test summary report, in accordance with an embodiment of the present invention. As shown in FIG. 5, the test execution log file 200 is input to a parser 502, which processes the test execution log file 200 to produce a well-formed XML test report file 504. It should be noted that the parser 502 can also be implemented as a Java utility using a Java code. As mentioned above, the test execution log file 200 includes information other than test result information. For example, the test execution log file 200 often includes compiling and execution information that is used in debugging and other test maintenance operations. The parser 502 processes this extra information to create the well-formed XML test report file In addition, the parser 502 can extract control characters not utilized during further operations of the process.

In one embodiment, the parser 502 detects compiler and execution information and other test information not enclosed in XML tags and relocates the data within CDATA tags. The CDATA tags can then be further processed or ignored by subsequent parsers. Generally, the data within the CDATA tags includes information not relevant to the results and thus is generally ignored by the parser. In further embodiments, compiler and execution information and other test information not enclosed in XML tags within the test execution log file 200 can be discarded.

As mentioned above, the parser 502 creates a well-formed XML test report file 504. In addition, embodiments of the present invention create the well-formed XML test report file 504 such that the XML enabled test reports are valid as well, according to the Test DTD. A well-formed XML document is an XML document that complies with XML well-formedness constraints. These constraints require that elements, which are named content containers, properly nest within each other and use other markup syntax correctly. Unlike HTML, well-formed XML elements are defined by their use, not by a rigid structural definition, allowing authors to create elements in response to their development. A valid XML document is an XML document that conforms with a corresponding DTD. As mentioned above, a DTD is a set of rules that a document follows, which software may need to read before processing and displaying a document. These rules generally state the name and contents of each element and in which contexts it can exist. Paragraph elements might be defined as containing keyword and code elements and as existing within section and note elements.

Although the well-formed XML test report file 504 is well-formed and valid according to the Test DTD, it is generally desirable to logically arrange the well-formed XML test report file 504 based on the test suites. Thus, the well-formed XML test report file 504 is processed by a logical XSLT stylesheet parser 506, which rearranges the well-formed XML test report file 504 into a logically arranged XML test report file 508.

As each test is executed, the results are written to the test execution log file 200 using the status utility, as described above with reference to FIG. 4. However, during a particular test cycle, a test engineer may run any number of tests that are available in a particular test suite. That is, although a particular test suite may include a predefined number of tests, the test engineer may run all, some, or none of the tests within the particular test suite. Thus, the actual number of test executed in a particular test suite may not be known until the test suite is actually executed. The embodiments of the present invention address this issue by writing test results to the test execution log file 200 in an independent manner. Specifically, each test result includes information identifying the test and the test suite to which the test belongs. Hence, the test results of the well-formed XML test reports file 504 are arranged as a plurality of independent test results, each identifying its test liD and the test suite to which the test belongs. For example, using the exemplary DTD 300 of FIG. 3, the Suite-Name attribute 310 can be used to logically arrange the tests. In this embodiment, all tests belonging to the same test suite, as indicated by the Suite-Name attribute 310, are arranged together under one XML element.

In one embodiment, the logical XSLT stylesheet parser 506 is written using XSLT. XSLT is a language used to convert an XML document into another XML document or into HTML, PDF, or some other format. The conversion is accomplished with a XSLT processor, which transforms the input based on XSLT extensions of the XSL stylesheet. XSL statements are also followed. The processor uses an XML parser to separate the XML elements into a tree structure, which the processor manipulates. Although, a logical XSLT stylesheet parser 506 is illustrated in FIG. 5, it should be noted that the logical parser 506 of the embodiments of present invention can be developed utilizing any computer programming language, such as Java, C, Assembly, or other computer programming languages as will be apparent to those skilled in the art.

The logical XSLT stylesheet parser 506 processes the well-formed XML test report file 504 into a logically arranged XML test report file 508. Specifically, the logical XSLT stylesheet parser 506 analyses the test result data of the well-formed XML test report file 504 to determine which test suites include which test results. The logical XSLT stylesheet parser 506 generates tags for each test suite so determined and encapsulates the test results corresponding to each test suite within the tags of the test suite. The new logically arranged test results are then written to the logically arranged XML test report file 508.

Once the test results are logically arranged within the logically arranged XML test report file 508, an HTML converter XSLT stylesheet parser 510 converts the logically arranged XML test report file 508 into an HTML test summary report 512. As the name implies, the HTML test summary report 512 comprises HTML code, which can be interpreted using a browser. HTML is the set of markup symbols or codes inserted in a file intended for display on a browser. The markup symbols are a sequence of characters or other symbols that are inserted at certain places in a text or word processing file to indicate how the file should look when it is printed or displayed or to describe the document's logical structure. These markup indicators are often called "tags."

The markup tells the browser how to display an HTML page's words and images for the user. Each individual markup code is referred to as a "tag." Some tags come in pairs that indicate when a particular display effect is to begin and when it is to end. HTML is generally adhered to by the major browsers, Microsoft's Internet Explorer and Netscape's Navigator, which also provide some additional non-standard codes.

For example, the HTML test summary report 512 can be displayed on a browser 514, thus, presenting the user with a summary of the detailed testing information included in the test execution log file 200. In addition, the HTML test summary report 512 includes a summary analysis of the test execution log file 200. Specifically, the HTML test summary report 512 can list the tests that were executed and whether the tests passed or failed. For example, the browser displayed HTML test summary report 514 of FIG. 5 illustrates two test suites, test suite X and test suite Y. Test suit X has thirty tests of which twenty-eight passed and two failed. Test suit Y has forty tests of which fourteen passed and twenty-six failed.

In addition, since the HTML test summary report 512 is written in HTML, a link 515 can be provided for test failures. The link 515 provides access to other HTML pages that describe the failure and why the failure occurred. In the case of failures, embodiments of the present invention can use the test execution log file 200 to determine where the failures are occurring and why the failures are occurring. These results can then be summarized in the HTML test summary report 512 and accompanying failure description pages 516. For example, when a user selects a link 515 for the failures of test suite X, the user is presented with a failure description page 516 describing the test failures of test suit X and why the failures occurred. The HTML test summary report 512 can then be distributed to the appropriate personal, such as the project manager or development team. Embodiments of the present invention can also describe test failures within the same document as the test summary report 512 and use local links to access the failure descriptions.

Figure 6:
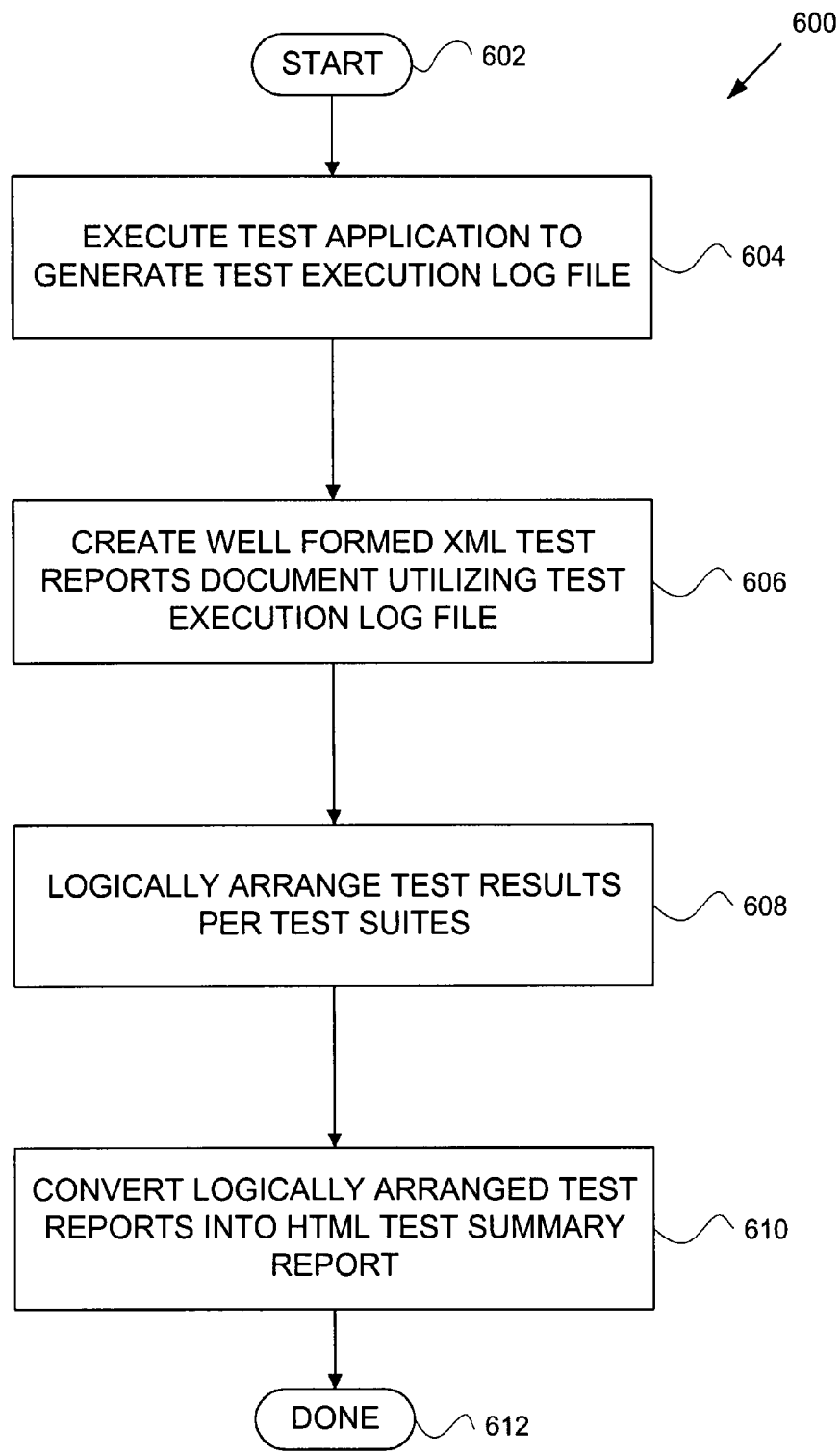
FIG. 6 is a flowchart showing a method for automated XML based report generation, in accordance with an embodiment of the present invention.

FIG. 6 is a flowchart showing a method 600 for automated XML based report generation, in accordance with an embodiment of the present invention. In an initial operation 602, preprocess operations are performed. Preprocess operations include generating test suites, determining which tests within the test suites to execute, and other preprocess operation that will be apparent to those skilled in the art.

In operation 604, the test application is executed and a test execution log file is generated. Generally, the test application includes a plurality of test suites, which are used to test various aspects of an environment. The results of the test execution are captured in a test execution log file, which includes detailed descriptions of the tests that were executed and the results of each test.

To generate the test results included in the test execution log file, embodiments of the present invention make function calls to a status utility, which includes functions that generate XML statements in accordance with a predefined test DTD. In particular, the test application includes function calls to the functions provided in the status utility, which return XML statements in accordance with the test DTD. The returned XML statements are then written to the test execution log file. As a result, the test execution log file includes test results that are XML enabled, in addition to non-XML enabled compiler and execution information.

In operation 606, a well-formed XML test report file is created using the test execution log file. The test execution log file is input to a parser, which processes the test execution log file to produce a well-formed XML test report file. As mentioned above, the test execution log file includes information other than test result information. For example, the test execution log file often includes compiling and execution information that is used in debugging and other test maintenance operations. The parser processes this extra information to create the well-formed XML test report file. In addition, as described above, the well-formed XML test report file generally is valid with respect to the test DTD.

In one embodiment, the parser detects compiler and execution information and other test information not enclosed in XML tags and relocates the data within CDATA tags. The CDATA tags can then be further processed or ignored by subsequent parsers.

The test results are logically arranged per the test suites, in operation 608. As each test is executed, the results are written to the test execution log file using the status utility in an independent manner. That is, each test result includes information identifying the test and the test suite to which the test belongs. Hence, the test results of the well-formed XML test report file are arranged as a plurality of independent test results, each identifying its test ID and the test suite to which the test belongs. A logical XSLT stylesheet parser processes the well-formed XML test report file into a logically arranged XML test report file. Specifically, the logical XSLT stylesheet parser analyses the test result data of the well-formed XML test report file to determine which test suites include which test results. The logical XSLT stylesheet parser generates tags for each test suite and encapsulates the test results corresponding to each test suite within the tags of the test suite. The new logically arranged test results are then written to the logically arranged XML test report file.

Once the test results are logically arranged within the logically arranged XML test report file, an HTML converter XSLT stylesheet parser converts the logically arranged XML test report file into an HTML test summary report, in operation 610. The HTML test summary report comprises HTML code, which can be interpreted using a browser. The HTML test summary report can be displayed on a browser, thus, presenting the user with a summary of the detailed testing information included in the test execution log file. In addition, the HTML test summary report can include a summary analysis of the test execution log file. Specifically, the HTML test summary report can list the tests that were executed and whether the tests passed or failed.

In addition, since the HTML test summary report is written in HTML, a link can be provided for test failures. The link provides access to other HTML pages that describe the failure and why the failure occurred. In the case of failures, embodiments of the present invention can use the test execution log file to determine where the failures are occurring and why the failures are occurring. These results can then be summarized in the HTML test summary report and accompanying failure description pages. Post process operations are performed in operation 612. Post process operations can include distributing the HTML test summary report to appropriate personal, such as the project manager or development team, and other post process operations that will be apparent to those skilled in the art.

Embodiments of the present invention may employ various computer-implemented operations involving data stored in computer systems to drive computer software, including application programs, operating system programs, peripheral device drivers, etc. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations. An exemplary structure for the invention is described below.

Figure 7:
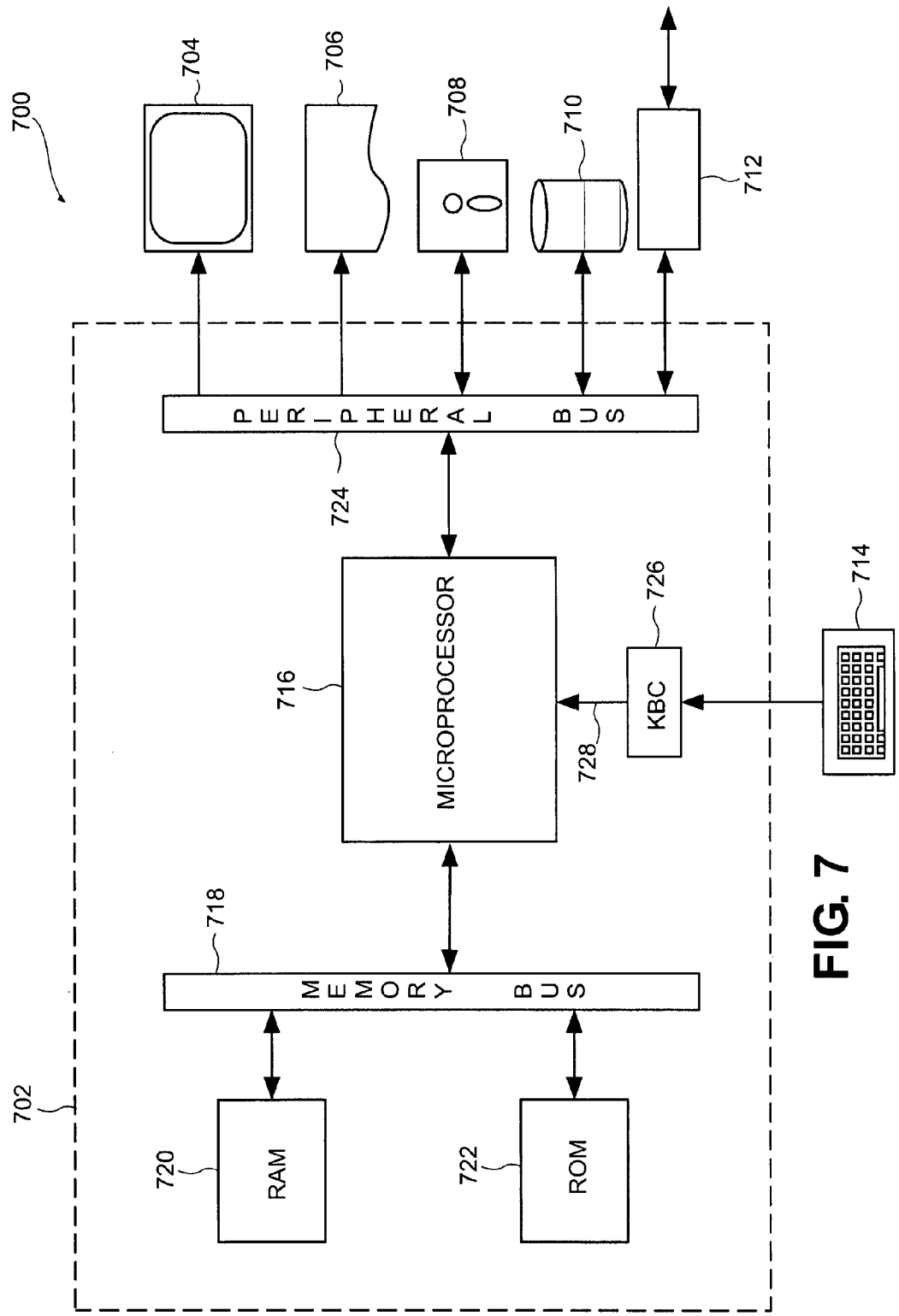
FIG. 7 is a block diagram of an exemplary computer system for carrying out the test processing according to the invention.

FIG. 7 is a block diagram of an exemplary computer system 700 for carrying out the processing according to the invention. The computer system 700 includes a digital computer 702, a display screen (or monitor) 704, a printer 706, a floppy disk drive 708, a hard disk drive 710, a network interface 712, and a keyboard 714. The digital computer 702 includes a microprocessor 716, a memory bus 718, random access memory (RAM) 720, read only memory (ROM) 722, a peripheral bus 724, and a keyboard controller (KBC) 726. The digital computer 702 can be a personal computer (such as an IBM compatible personal computer, a Macintosh computer or Macintosh compatible computer), a workstation computer (such as a Sun Microsystems or Hewlett-Packard workstation), or some other type of computer.

The microprocessor 716 is a general purpose digital processor which controls the operation of the computer system 700. The microprocessor 716 can be a single-chip processor or can be implemented with multiple components. Using instructions retrieved from memory, the microprocessor 716 controls the reception and manipulation of input data and the output and display of data on output devices. According to the invention, a particular function of microprocessor 716 is to execute the test application to generate the test execution log. In addition, the microprocessor 716 further controls the execution of the parser, Logical XSLT stylesheet parser, and HTML converter XSLT stylesheet parser.

The memory bus 718 is used by the microprocessor 716 to access the RAM 720 and the ROM 722. The RAM 720 is used by the microprocessor 716 as a general storage area and as scratch-pad memory, and can also be used to store input data and processed data. The ROM 722 can be used to store instructions or program code followed by the microprocessor 716 as well as other data.

The peripheral bus 724 is used to access the input, output, and storage devices used by the digital computer 702. In the described embodiment, these devices include the display screen 704, the printer device 706, the floppy disk drive 708, the hard disk drive 710, and the network interface 712. The keyboard controller 726 is used to receive input from keyboard 714 and send decoded symbols for each pressed key to microprocessor 716 over bus 728.

The display screen 704 is an output device that displays images of data provided by the microprocessor 716 via the peripheral bus 724 or provided by other components in the computer system 700. The printer device 706, when operating as a printer, provides an image on a sheet of paper or a similar surface. Other output devices such as a plotter, typesetter, etc. can be used in place of, or in addition to, the printer device 706.

The floppy disk drive 708 and the hard disk drive 710 can be used to store various types of data. The floppy disk drive 708 facilitates transporting such data to other computer systems, and hard disk drive 710 permits fast access to large amounts of stored data.

The microprocessor 716 together with an operating system operate to execute computer code and produce and use data. The computer code and data may reside on the RAM 720, the ROM 722, or the hard disk drive 710. The computer code and data could also reside on a removable program medium and loaded or installed onto the computer system 700 when needed. Removable program media include, for example, CD-ROM, PC-CARD, floppy disk and magnetic tape.

The network interface 712 is used to send and receive data over a network connected to other computer systems. An interface card or similar device and appropriate software implemented by the microprocessor 716 can be used to connect the computer system 700 to an existing network and transfer data according to standard protocols.

The keyboard 714 is used by a user to input commands and other instructions to the computer system 700. Other types of user input devices can also be used in conjunction with the present invention. For example, pointing devices such as a computer mouse, a track ball, a stylus, or a tablet can be used to manipulate a pointer on a screen of a general-purpose computer.

The invention can also be embodied as computer readable code on a computer readable medium. The computer readable medium is any data storage device that can store data which can be thereafter be read by a computer system. Examples of the computer readable medium include read-only memory (ROM), random-access memory (RAM), CD-ROMs, magnetic tape, and optical data storage devices. The computer readable medium can also be distributed over a network that couples computer systems so that the computer readable code is stored and executed in a distributed fashion.

Furthermore, the same or similar methods and apparatuses described above for programming a hardware device can also be used for performing other particular maintenance operations on the hardware device. For example, operations such as erasing a ROM, reading a ROM, or performing a checksum on a ROM can be performed.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for creating a test summary report, comprising the operations of:
   executing a computer software test application on a platform, the computer software test application having one or more test suites, each test suit including one or more test cases, each test case configured to test an aspect of the platform;
   generating test results in an Extensible Markup Language (XML) enabled format independent of an XML format capability of the platform; and
   using the XML enabled test results to create a test summary report,
   wherein the XML enabled test results is capable of being rearranged, the rearranged XML enabled test results including test suite tags, each test suite tag encapsulating the test results corresponding to each test suite of the computer software test application.

2. A method as recited in claim 1, wherein the test results are generated utilizing a status utility having functions that generate XML code.

3. A method as recited in claim 1, wherein the test results are output to a test execution log file, the test execution log file including a log of the test execution.

4. A method as recited in claim 3, further including the operation of processing the test execution log file to generate a well-formed XML test reports file.

5. A method as recited in claim 4, wherein the well-formed XML test reports file is further valid with respect to a Test document type definition (DTD).

6. A method as recited in claim 4, wherein a content of the well-formed XML test reports file is reordered so as to create a logically arranged XML test reports file.

7. A method as recited in claim 6, wherein the logically arranged XML test reports file includes test suite tags indicating test reports that belong to particular test suites.

8. A method as recited in claim 6, wherein the test summary report is generated by converting the logically arranged XML test reports file into a Hypertext Markup Language (HTML) test summary report.

9. A method as recited in claim 8, wherein the HTML test summary report provides a test summary of the test execution log file.

10. A method as recited in claim 9, wherein the HTML test summary report includes links to failure description pages, wherein the failure description pages provide a detailed description of a particular test failure.

11. An Extensible Markup Language (XML) based report generator, comprising:
    a parser that processes a test execution log file to generate a well-formed XML test reports file, wherein the test execution log file includes XML statements generated independent of an XML format capability of a platform being tested;
    a logical parser operable to use the well-formed XML test reports file to reorder a content of the well-formed XML test reports file to produce a logically arranged XML test reports file, the logically arranged XML test reports file including test suite tags encapsulating the test results corresponding to each test suite; and
    an HTML converter parser that converts the logically arranged XML test reports file into an HTML test summary file.

12. An XML based report generator as recited in claim 11, wherein the well-formed XML test reports file is valid with respect to a Test document type definition (DTD).

13. An XML based report generator as recited in claim 11, wherein the HTML test summary report provides a test summary of the test execution log file.

14. An XML based report generator as recited in claim 13, wherein the HTML test summary report includes links to failure description pages, wherein the failure description pages provide a detailed description of a particular test failure.

15. A method for creating a test summary report, comprising the operations of:
    executing a test application on a platform, wherein the test application is executed using a status utility having functions that generate XML code, the test application having one or more test suites, each test suite having one or more test cases, each test case configured to test an aspect of the platform;
    generating test results in an Extensible Markup Language (XML) enabled format independent of an XML format capability of the platform using the status utility, wherein the test results are output to a test execution log file;
    using the test execution log file to generate a well-formed XML test reports file;
    reordering a content of the well-formed XML test reports file to create a logically arranged XML test reports file wherein test suite tags are generated for each test suite, each test suite tag encapsulating the test results corresponding to each test suite; and
    converting the logically arranged XML test reports file into an HTML test summary report.

16. A method as recited in claim 15, wherein the well-formed XML test reports file is further valid with respect to a Test document type definition (DTD).

17. A method as recited in claim 15, wherein the HTML test summary report provides a test summary of the test execution log file.

18. A method as recited in claim 17, wherein the HTML test summary report includes links to failure description pages, wherein the failure description pages provide a detailed description of a particular test failure.

19. A computer generated method of generating and processing test results, comprising the operations of:

executing one or more tests from a plurality of test suites and generating test execution log file wherein each test result includes data identifying the test to which the test result relates the test suite to which the test belongs, each test suite of the plurality of test suites having one or more test cases, each test case configured to test an aspect of the platform;

processing the test execution log file to generate a well-formed XML based test reports file independent of an XML format capability of a platform being tested, wherein the test results in the test reports file are arrange as a plurality of independent test results, each including a test ID and data identifying a test suite to which a test belongs;

processing the well-formed XML test reports file to logically arrange the well-formed XML test reports file to create a logically arranged XML test reports file in which tags are generated for each test suite the tags encapsulating the test results corresponding to each test suite; and outputting the logically arranged well-formed XML test reports file.

* * * * *